(12) United States Patent
Vujcic et al.

(10) Patent No.: US 9,713,172 B2
(45) Date of Patent: *Jul. 18, 2017

(54) METHODS AND PROCEDURES FOR HIGH SPEED UE ACCESS

(71) Applicant: LG ELECTRONICS INC., Seoul (KR)

(72) Inventors: Dragan Vujcic, Villepinte (FR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,144

(22) Filed: Jan. 9, 2017

(65) Prior Publication Data

US 2017/0118778 A1    Apr. 27, 2017

Related U.S. Application Data

(63) Continuation of application No. 15/228,376, filed on Aug. 4, 2016, now Pat. No. 9,578,660, which is a continuation of application No. 14/480,342, filed on Sep. 8, 2014, now Pat. No. 9,445,437, which is a continuation of application No. 14/301,113, filed on Jun. 10, 2014, now Pat. No. 8,862,172, which is a
(Continued)

(51) Int. Cl.
*H04W 74/08*    (2009.01)
*H04W 74/00*    (2009.01)
*H04W 48/12*    (2009.01)
*H04J 13/00*    (2011.01)

(52) U.S. Cl.
CPC ..... *H04W 74/0833* (2013.01); *H04J 13/0062* (2013.01); *H04W 48/12* (2013.01); *H04W 74/004* (2013.01)

(58) Field of Classification Search
CPC . H04W 74/00; H04W 74/002; H04W 74/004; H04W 74/006; H04W 74/008; H04W 74/08; H04W 74/0833
See application file for complete search history.

(56) References Cited

U.S. PATENT DOCUMENTS

2002/0119799 A1    8/2002    Moulsley et al.
2003/0176195 A1    9/2003    Dick et al.
(Continued)

FOREIGN PATENT DOCUMENTS

CN    1378730    11/2002
CN    1533055    9/2004
(Continued)

OTHER PUBLICATIONS

Qualcomm Europe, "Access Procedures," 3GPP TSG-RAN WG2, R2-060996, Mar. 2006, 3 pages.
(Continued)

*Primary Examiner* — Ashley Shivers
(74) *Attorney, Agent, or Firm* — Lee Hong Degerman Kang & Waimey

(57) ABSTRACT

A terminal random access procedure is improved by allowing a mobile terminal to correctly map signature indexes onto cyclic shifted Zadoff-Chu (ZC) sequences when the deployed cells support a high-speed mobility by informing a mobile terminal whether a cell supports high-speed mobility.

20 Claims, 18 Drawing Sheets

Related U.S. Application Data continuation of application No. 11/958,118, filed on Dec. 17, 2007, now Pat. No. 8,787,957.

(60) Provisional application No. 60/889,520, filed on Feb. 12, 2007.

(56) References Cited

U.S. PATENT DOCUMENTS

| | | | |
|---|---|---|---|
| 2007/0171995 | A1 | 7/2007 | Muharemovic et al. |
| 2007/0183386 | A1 | 8/2007 | Muharemovic et al. |
| 2007/0253465 | A1* | 11/2007 | Muharemovic ....... H04L 5/0007 375/130 |
| 2008/0101306 | A1 | 5/2008 | Bertrand et al. |
| 2010/0034165 | A1* | 2/2010 | Han ................. H04L 5/023 370/330 |
| 2010/0220664 | A1 | 9/2010 | Hooli et al. |
| 2014/0376494 | A1 | 12/2014 | Vujcic et al. |
| 2016/0345365 | A1 | 11/2016 | Vujcic et al. |

FOREIGN PATENT DOCUMENTS

| | | |
|---|---|---|
| JP | 2001-069576 | 3/2001 |
| JP | 2002539667 | 11/2002 |
| JP | 2004-282653 | 10/2004 |
| JP | 2006500804 | 1/2006 |
| JP | 2006-054860 | 2/2006 |
| RU | 2214686 | 4/2002 |
| RU | 2304348 | 1/2006 |
| TW | I271079 | 1/2007 |
| WO | 2004/030392 | 4/2004 |
| WO | 2006/117078 | 11/2006 |
| WO | 2008/081311 | 7/2008 |

OTHER PUBLICATIONS

Masson, "E-UTRA RACH within the LTE system," Master's Degree Project, Stockholm, Sweden, Ch. 5, Feb. 2006, 14 pages.

Nokia, "Restricted sets of RACH preamble signatures for environments with high Doppler shifts," 3GPP TSG RAN WG1 #47bis, R1-070377, Jan. 2007, 6 pages.

Panasonic, et al., "Non-synchronized RACH preamble structure for high mobility UE," TSG-RAN WG1 Meeting #47bis, R1-070188, Jan. 2007, 11 pages (relevant sections: sections 1, 3.1, 3.3).

LG Electronics, "Ways to Mitigate Frequency Offset with CAZAC Cyclic Shift," 3GPP TSG RAN WG1 Meeting #47bis, R1-070227, Jan. 2007, 8 pages.

European Patent Office Application Serial No. 078514643, Search Report dated Jul. 23, 2013, 9 pages.

\* cited by examiner

METHODS AND PROCEDURES FOR HIGH SPEED UE ACCESS

CROSS-REFERENCE TO RELATED APPLICATIONS

This application is a continuation of U.S. patent application Ser. No. 15/228,376, filed on Aug. 4, 2016, now U.S. Pat. No. 9,578,660, which is a continuation of U.S. patent application Ser. No. 14/480,342, filed on Sep. 8, 2014, now U.S. Pat. No. 9,445,437, which is a continuation of U.S. application Ser. No. 14/301,113, filed on Jun. 10, 2014, now U.S. Pat. No. 8,862,172, which is a continuation of U.S. application Ser. No. 11/958,118, filed on Dec. 17, 2007, now U.S. Pat. No. 8,787,957, which claims the benefit of U.S. Provisional Application No. 60/889,520 filed on Feb. 12, 2007, the contents of which are all hereby incorporated by reference herein in their entirety.

FIELD OF THE INVENTION

The present invention is directed to a mobile terminal random access procedure for obtaining uplink time synchronization and access to a network and specifically to an apparatus and method that allows a mobile terminal to correctly map signature indexes onto cyclic shifted Zadoff-Chu (ZC) sequences when the deployed cells support a high-speed mobility by informing a mobile terminal whether a cell supports high-speed mobility.

DESCRIPTION OF THE RELATED ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the $G_S$ interface, to the gateway GPRS support node (GGSN) 9 via the $G_N$ interface, and to the home subscriber server (HSS) via the $G_R$ interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the $N_B$ interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

The "originating call" establishment cause indicates that the UE 1 wants to setup a connection, for example, a speech connection. The "terminating call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in "The GSM System for Mobile Communications" published by M. Mouly and M. B. Pautet, 1992. As the present invention is related to UMTS enhancement and evolution, the W-CDMA random access procedure is detailed herein. Although the present invention is explained in the context of UMTS evolution, the present invention is not so limited.

The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

TABLE I

Establishment Causes

Originating Conversational Call
Originating Streaming Call
Originating Interactive Call
Originating Background Call
Originating Subscribed traffic Call
Terminating Conversational Call
Terminating Streaming Call
Terminating Interactive Call
Terminating Background Call
Emergency Call
Inter-RAT cell re-selection
Inter-RAT cell change order
Registration
Detach
Originating High Priority Signaling
Originating Low Priority Signaling
Call re-establishment
Terminating High Priority Signaling
Terminating Low Priority Signaling The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

The main characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part The timing at which the UE 1 can send the preamble is divided by random access sub channels. A random access sub channel is a subset including the combination of all uplink access slots. There are 12 random access sub channels. A random access sub channel consists of the access slots indicated in Table II.

TABLE II

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | 0 | 1 | 2 | |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table III lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

TABLE III

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

Each slot includes a data part and a control part that transmits control information, such as pilot bits and TFCI. The data part and the control part are transmitted in parallel. The 20 ms long message part consists of two consecutive message part radio frames. The data part consists of 10*2 k bits, where k=0, 1, 2, 3, which corresponds to a Spreading Factor (SF) of 256, 128, 64, 32. FIG. 9 illustrates the structure of the random access message part.

The AICH consists of a repeated sequence of 15 consecutive access slots, each slot having a length of 40 bit intervals or 5120 chips. Each access slot includes two parts, an Acquisition Indicator (AI) part consisting of 32 real-valued signals, such as a0 . . . a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, −1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 must repeat the access attempt some time later.

All UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table IV lists the special AC and their allocation.

TABLE IV

| AC | Allocation |
|---|---|
| 15 | PLMN Staff |
| 14 | Emergency Services |
| 13 | Public Utilities (e.g. water/gas suppliers) |
| 12 | Security Services |
| 11 | |

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions.

Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table V.

TABLE V

| AC | Applicability |
|---|---|
| 0-9 | Home and Visited PLMNs |
| 11 and 15 | Home PLMN only |
| 12, 13, 14 | Home PLMN and visited PLMNs of home country only |

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

The AC are mapped to ASC In the UMTS. There are eight different priority levels defined, specifically ASC 0 to ASC 7, with level 0 representing the highest priority.

Access Classes shall only be applied at initial access, such as when sending an RRC Connection Request message. A mapping between AC and ASC shall be indicated by the information element "AC-to-ASC mapping" in System Information Block type 5. The correspondence between AC and ASC is indicated in Table VI.

TABLE VI

| AC  | 0-9    | 10     | 11     | 12     | 13     | 14     | 15     |
|-----|--------|--------|--------|--------|--------|--------|--------|
| ASC | $1^{st}$ IE | $2^{nd}$ IE | $3^{rd}$ IE | $4^{th}$ IE | $5^{th}$ IE | $6^{th}$ IE | $7^{th}$ IE |

In Table VI, "nth IE" designates an ASC number i in the range 0-7 to AC. The UE 1 behavior is unspecified if the ASC indicated by the "nth IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, Pv≤1, to attempt a transmission. Another important mechanism to control random access transmission is a load control mechanism that reduces the load of incoming traffic when the collision probability is high or when the radio resources are low. A flow chart of the control access procedure is illustrated in FIG. 11.

Existing specifications provide many RACH transmission control parameters that are stored and updated by the UE 1 based on system information broadcast by the UTRAN 2. These parameters are received from RRC (S10). The RACH transmission control parameters include PRACH, ASC, maximum number of preamble ramping cycles ($M_{max}$), range of backoff interval for timer ($T_{BO1}$) specified as a number of 10 ms transmission time intervals ($N_{BO1max}$ and $N_{BO1min}$) and applicable when NACK is received on AICH.

When it is determined that there is data to transmit (S20), the UE 1 maps the assigned AC to an ASC (S30). A count value M is then set to zero (S40).

The count value M is then incremented by one (S50). The UE 1 determines if the count value M, which represents the maximum number of RACH transmission attempts, exceeds the maximum number of permitted RACH transmission attempts $M_{max}$ (S60).

The UE 1 treats the transmission as unsuccessful if M exceeds $M_{max}$. The UE 1 then indicates the unsuccessful transmission to a higher layer (S70)

However, the UE 1 proceeds with the RACH access procedure if M is less than or equal to $M_{max}$. The UE 1 updates the RACH transmission control parameters (S80). A 10 ms timer $T_2$ is set (S90) and the UE 1 determines whether to attempt transmission based on the persistence value $P_i$ associated with the ASC selected by the UE.

Specifically, a random number between 0 and 1, $R_i$, is generated (S100) and the random number is compared to the persistence value (S110). The UE 1 does not attempt transmission if $R_i$ is less than or equal to the persistence value $P_i$ and waits until the 10 ms timer $T_2$ expires (S120) before repeating the RACH access procedure by updating the RACH transmission control parameters (S80). However, the UE 1 attempts to transmit using assigned RACH resources (S130) if $R_i$ is less than or equal to the persistence value $P_i$.

The UE 1 determines whether the response from the network is an Acknowledgement (ACK), a Non-Acknowledgment (NACK) or no response (S150) after the access attempt is transmitted. The UE 1 begins message transmission (S160) if an ACK is received, thereby indicating receipt of the UE transmission by the UTRAN 2. The UE 1 does not transmit the message and repeats the RACH access procedure by incrementing the count value M (S50) if no response is received or a NACK is received, thereby indicating a failed receipt of the transmission by the network, for example, due to a collision.

The UE 1 only waits until the 10 ms timer $T_2$ expires (S170) before repeating the RACH access procedure if no response was received. However, the UE 1 waits until the 10 ms timer $T_2$ expires (S180) and also randomly generates a back off value $N_{BO1}$ associated with the PRACH assigned to the UE and between $N_{BO1max}$ and $N_{BO1min}$ and waits an additional back off interval $T_{BO1}$ that is equal to 10 ms multiplied by the back off value $N_{BO1}$ (S190) before repeating the RACH access procedure if a NACK was received.

The physical layer (L1) random access procedure is initiated upon request from the MAC sub layer (L2). The physical layer receives information from a higher layer, specifically the RRC, before the physical random-access procedure is initiated and receives information from a higher layer, specifically the MAC, at each initiation of the physical random access procedure. The information is indicated in Table VII. The physical layer random-access procedure is illustrated in FIG. 12.

As illustrated in FIG. 12, one access slot in the random access subchannel that can be used for the given ASC is randomly selected from access slots that can be used in the next full access slot sets (S200). One access slot is randomly chosen from access slots that can be used in the next full access slot sets if there are no access slots available. One signature is then randomly selected from the set of available signatures within the given ASC (S210).

The preamble retransmission counter is set at Preamble Retrans Max (S220), which is the maximum number of preamble retransmission attempts. The preamble transmission power is set at Preamble Initial Power (S230), which is the initial transmission power of the preamble. The preamble is then transmitted according to the chosen uplink access slot, signature and set transmission power (S240).

The UE 1 then determines whether the UTRAN 2 detected the preamble (S250). No random access message is transmitted if a NACK is detected in the downlink access slot corresponding to the selected uplink access slot. A random access message is transmitted if an ACK is detected in the downlink access slot corresponding to the selected uplink access slot. The preamble is retransmitted if no response, specifically neither an ACK nor a NACK for the selected signature, is detected in the downlink access slot corresponding to the selected uplink access slot.

TABLE VII

| Information Related to Physical Random-Access Procedure | |
|---|---|
| Before Initiation of Procedure | Upon Initiating Procedure |
| Preamble scrambling code. | Transport Format for PRACH message part. |
| Message length in time (10 or 20 ms) | ASC of the PRACH transmission |
| AICH_Transmission_Timing parameter (0 or 1) | Data to be transmitted (Transport Block Set) |
| Set of available signatures and set of available RACH sub-channels for each Access Service Class (ASC). | |
| Power-ramping factor Power Ramp Step | |

TABLE VII-continued

Information Related to Physical Random-Access Procedure

| Before Initiation of Procedure | Upon Initiating Procedure |
|---|---|
| (integer > 0) Preamble Retrans Max parameter (integer > 0) Initial preamble power (Preamble_Initial_Power) Power offset in dB between power of the last transmitted preamble and power of the control part of the random-access message ($P_{p-m} = P_{message-control} - P_{preamble}$ measured) Set of Transport Format parameters (including power offset between the data part and the control part of the random-access message for each Transport Format) | |

When no response is received, the next available access slot is selected from the random access subchannel within the given ASC (S260), a new signature is randomly selected from the available signatures within the given ASC (S270), the preamble transmission power is increased by the step width of the power ramping (Power Ramp Step) (S280) and the preamble retransmission counter is reduced by 1 (S290). The UE 1 then determines if the maximum number of retransmissions have been attempted (S300). This preamble re-transmission procedure is repeated for as long as the preamble retransmission counter exceeds 0 and no response is received. The MAC is informed that no ACK was received on AICH (S310) and the physical layer random access procedure is terminated once the retransmission counter reaches 0.

If an ACK is received, the transmission power of the control channel of the random access message is set at a level higher than the transmission power of the last preamble transmitted according to a power offset (S320) and the random access message is transmitted 3 or 4 uplink access slots after the uplink access slot of the last transmitted preamble depending on the AICH transmission timing parameter (S330). The higher layer is then informed of the receipt of the ACK and transmission of the random access message (S340) and the physical layer random access procedure is terminated.

If a NACK is received, no random access message is transmitted and no re-transmission of the preamble is performed. The MAC is informed that a NACK was received (S350) and the physical layer random access procedure is terminated.

FIG. 13 illustrates a signaling establishment procedure between a UE 1 and UTRAN 2. As illustrated in FIG. 13, the RRC Connection Request message is transmitted once the PRACH power control preambles have been acknowledged (S400). The RRC Connection Request message includes a reason for requesting the connection.

The UTRAN 2 determines which resources to reserve and performs synchronization and signaling establishment among radio network nodes, such as a NodeB 5 and serving RNC 4, depending on the request reason (S410). The UTRAN 2 then transmits the Connection Setup message to the UE 1, thereby conveying information about radio resource to use (S420).

The UE 1 confirms connection establishment by sending the Connection Setup Complete message to the UTRAN 2 (S430). The UE 1 transmits the Initial Direct Transfer message to the UTRAN 2 once the connection has been established (S440). The Initial Direct Transfer message includes information such as the UE identity, UE current location and the kind of transaction requested.

Authentication is then performed between the UE 1 and UTRAN 2 and security mode communication is established (S450). The actual set up information is delivered to the UTRAN 2 from the UE 1 via the Call Control Setup message (S460). The Call Control Setup message identifies the transaction and indicates the QoS requirements.

The UTRAN 2 initiates activities for radio bearer allocation by determining if there are sufficient resources available to satisfy the requested QoS and transmits the Call Control Complete message to the UE 1 (S470). The radio bearer is allocated according to the request if there are sufficient resources available. The UTRAN 2 may select either to continue allocation with a lowered QoS value, queue the request until sufficient radio resources become available or reject the call request if sufficient resources are not presently available.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB in the LTE system. The following is the overview of the current LTE study assumption for RACH.

The random access procedure is classified into two categories; non-synchronized random access and synchronized random access. Only the non-synchronized random access procedure is considered herein.

Non-synchronized access is used when the uplink from a UE 1 has not been time synchronized or when the UE uplink loses synchronization. Non-synchronized access allows the UTRAN 2 to estimate and adjust the UE 1 transmission timing if necessary. Therefore the non-synchronized random access preamble is used for at least time alignment and signature detection.

FIG. 14 illustrates a random access burst. The message payload may include any additional associated signaling information, such as a random ID, Pathloss/Channel Quality indicator (CQI), or access purpose. A message payload up to 6 bits is transmitted in the random access burst along with the preamble as illustrated in FIG. 14.

A UE 1 randomly selects a signature from a group of signatures to distinguish between different UEs that attempt an access simultaneously. The preamble must have good auto-correlation properties in order for the UTRAN 2 to obtain an accurate timing estimate.

Additionally, different preambles should have good cross-correlation properties in order for the UTRAN 2 to distinguish between simultaneous access attempts for different UEs 1 using different signatures. A constant amplitude zero auto-correlation (CAZAC) sequence is used as a preamble signature sequence to achieve good detection probability.

Layer 1 shall receive the information listed in Table VIII from the higher layers prior to initiation of the non-synchronized physical random access procedure. The information is transmitted as part of the System Information from higher layers.

TABLE VIII

Information received from higher layers prior to initiation of the non-synchronized physical random access procedure Random access channel parameters (number, frequency position, time period, and timing offset)
Preamble format for the cell
Number of root ZC sequences and sequence indices
Preamble mapping to implicit message (set of cause values, CQI quantization parameters, signature mapping)
Power ramping step size (note 0 dB step size is allowed)
Maximum number of preamble retransmissions FIG. 15 illustrates a call flow diagram for a non-synchronized physical random access procedure. As illustrated in FIG. 15, the physical layer (L1) random access procedure encompasses successful transmission of the random access preamble (message 1) and the random access response (message 2). The remaining messages are scheduled for transmission by the higher layer on the shared data channel and thus are not considered part of the L1 random access procedure. A random access channel is a 1.08 MHz portion of a subframe or set of consecutive subframes reserved for random access preamble transmissions.

A random access channel is randomly selected from the available non-synchronized random access channels and a preamble sequence is then randomly selected from the available preamble set based on the message to be transmitted. The random access procedure ensures that each of the allowed selections is chosen with equal probability.

The initial preamble transmission power level, which is set by the MAC, is determined using an open loop power control procedure. The transmission counter is set to the maximum number of preamble retransmissions.

A Random Access Preamble (message 1) is then transmitted using the selected random access channel, preamble sequence, and preamble transmission power. The L1 status "ACK on non-synchronized random access received" is reported to the higher layers, such as the MAC, and the physical random access procedure is terminated if a Random Access Response (message 2) corresponding to the transmitted preamble sequence (message 1) is detected. Another random access channel and preamble are randomly selected if no Random Access Response (message 2) corresponding to the transmitted preamble sequence (message 1) is detected.

Preamble retransmission occurs as long as the maximum transmission power and the maximum number of retransmissions have not been reached. The L1 status "no acknowledgment on non-synchronized random access" is reported to the higher layers, such as the MAC, and the physical random access procedure is terminated if the maximum transmission power or the maximum number of retransmissions has been reached.

The main purpose of the LTE (Long Term Evolution) random access procedure is to obtain uplink time synchronization and to obtain access to the network. A random access mechanism can be described where a preamble is sent from a UE 1 to a NodeB 5 in order to determine the timing misalignment. The preamble structure is based on Zadoff-Chu sequences with Zero Correlation Zone (ZC-ZCZ) and different root sequence indices when the required number of zones cannot be generated.

The zero-correlation zone for the ZC-ZCZ sequence is generated using a cyclic shift version of the Zadoff-Chu (ZC) carrier sequence. Cyclic shifts within the same root sequence then form an ideal set of signatures for LTE RACH preambles since their cross-correlation is zero.

However, this is true only if the frequency error is small and for UEs 1 with low mobility. The excellent properties of ZC-ZCZ sequences disappear as the frequency error increase for high-speed mobility UEs 1, thereby inducing overlapping between shifted sequences and making the sequence detection poor and impossible in some cases. Therefore, the cyclic shift is designed to avoid overlapping with the next shifted position when high-speed mobility UEs 1 are supported within the cell, which results in the use of a restricted set of cyclic shifts.

In other words the preamble cyclic shift length design differs for cells supporting high-speed mobility UEs 1. In fact, the cyclic shift depends not only on cell size but is also proportional to sequence index when there is high Doppler.

Therefore, the LTE RACH preamble sequence design is different for low and high mobility UEs 1. Furthermore, the conventional procedure does not use Zadoff-Chu sequences with Zero Correlation Zone (ZC-ZCZ) sequences for the RACH preamble.

For example, the WCDMA RACH preamble consists of 4096 chips, which is a sequence of 256 repetitions of Hadamard codes of length 16 and scrambling codes. This facilitates simple and accurate frequency error estimation then the same sequence design is used for both low and high speed UEs 1.

SUMMARY OF THE INVENTION

In one aspect of the present invention, a method of establishing a communication link between a mobile terminal and a network is provided. The method includes receiving an indication of whether a communication cell supports high speed mobility, generating sequences corresponding to signatures available for random access and requesting access to the network using a selected one of the generated sequences, wherein either the sequences are generated according to whether high speed mobility is supported or the generated sequence is selected according to whether high speed mobility is supported.

It is contemplated that the generated sequences are cyclic shifted Zadoff-Chu (ZC) sequences and further comprising mapping allowable signatures onto the cyclic shifted ZC sequences. It is further contemplated that each available random access signature is mapped onto a cyclic shifted ZC sequence using all possible cyclic shifted ZC sequences if high mobility is not supported. Preferably, each available random access signature is mapped onto a cyclic shifted ZC sequence using a restricted set of all possible sequences, the restricted set determined according to a sequence index.

In another aspect of the present invention, a method of establishing a communication link between a mobile terminal and a network is provided. The method includes generating sequences corresponding to signatures available for random access, the sequences generated according to a process that either supports high mobility or does not support high speed mobility, transmitting an indication of whether high speed mobility is supported, receiving an access request from a mobile terminal, the access request using a selected one of the generated sequences and correlating the received request to each of the generated sequences in order to determine which of the generated sequences was used by the mobile terminal.

It is contemplated that the generated sequences are cyclic shifted Zadoff-Chu (ZC) sequences and further comprising mapping allowable signatures onto the cyclic shifted ZC sequences. It is further contemplated that each available random access signature is mapped onto a cyclic shifted ZC sequence using all possible cyclic shifted ZC sequences if high-speed mobility is not supported. Preferably, each available random access signature is mapped onto a cyclic shifted ZC sequence using a restricted set of all possible sequences, the restricted set determined according to a sequence index.

In another aspect of the present invention, a method of establishing a communication link between a mobile terminal and a network is provided. The method includes receiving an indication of whether a cell supports high-speed mobility and requesting access to the network using the indication, wherein the indication indicates information on restricted use of cyclic shifts.

It is contemplated that the indication comprises one bit. It is further contemplated that requesting access to the network includes generating sequences corresponding to signatures available for random access and requesting access to the network using a selected one of the generated sequences, wherein either the sequences are generated according whether high speed mobility is supported or the generated sequence is selected according to whether high speed mobility is supported. Preferably, the generated sequences are cyclic shifted Zadoff-Chu (ZC) sequences and further comprising mapping allowable signatures onto the cyclic shifted ZC sequences, each available random access signature mapped onto a cyclic shifted ZC sequence using a restricted set of all possible sequences, the restricted set determined according to the indication.

In another aspect of the present invention, a method of establishing a communication link between a mobile terminal and a network is provided. The method includes transmitting an indication of whether a cell supports high speed mobility and receiving a request to access the network from the mobile terminal, wherein the indication indicates information on restricted use of cyclic shifts and the request is based on the indication.

It is contemplated that the indication comprises one bit. It is further contemplated that the method further includes generating sequences corresponding to signatures available for random access, the sequences generated according to a process that either supports high mobility or does not support high speed mobility, receiving the access request from the mobile terminal, the access request using a selected one of the generated sequences and correlating the received request to each of the generated sequences in order to determine which of the generated sequences was used by the mobile terminal. Preferably, the generated sequences are cyclic shifted Zadoff-Chu (ZC) sequences and further comprising mapping allowable signatures onto the cyclic shifted ZC sequences, each available random access signature mapped onto a cyclic shifted ZC sequence using a restricted set of all possible sequences, the restricted set determined according to the indication.

In another aspect of the present invention, a mobile terminal for of establishing a communication link with a network is provided. The mobile terminal includes a transmitting/receiving unit transmitting and receiving messages between the mobile terminal and the network, a display unit displaying user interface information, an input unit receiving inputs from a user and a processing unit processing a received indication of whether a communication cell supports high speed mobility, generating sequences corresponding to signatures available for random access and controlling the transmitting/receiving unit to request access to the network using a selected one of the generated sequences, wherein the processing unit either generates the sequences according to whether high speed mobility is supported or the selects the generated sequence according to whether high speed mobility is supported.

It is contemplated that the generated sequences are cyclic shifted Zadoff-Chu (ZC) sequences and the processing unit further maps allowable signatures onto the cyclic shifted ZC sequences. It is further contemplated that the processing unit maps each available random access signature onto a cyclic shifted ZC sequence using all possible cyclic shifted ZC sequences if high mobility is not supported. Preferably, the processing unit maps each available random access signature onto a cyclic shifted ZC sequence using a restricted set of all possible sequences, the restricted set determined according to a sequence index.

In another aspect of the present invention, a mobile terminal for of establishing a communication link with a network is provided. The mobile terminal includes a transmitting/receiving unit transmitting and receiving messages between the mobile terminal and the network, a display unit displaying user interface information, an input unit receiving inputs from a user and a processing unit processing a received indication of whether a cell supports high speed mobility and controlling the transmitting/receiving unit to request access to the network using the indication, wherein the indication indicates information on restricted use of cyclic shifts.

It is contemplated that the indication comprises one bit. It is further contemplated that processing unit controls the transmitting/receiving unit to request access to the network by generating sequences corresponding to signatures available for random access and requests access to the network using a selected one of the generated sequences, wherein the processing unit either generates the sequences according to whether high speed mobility is supported or the selects the generated sequence according to whether high speed mobility is supported. Preferably, the generated sequences are cyclic shifted Zadoff-Chu (ZC) sequences and the processing unit maps allowable signatures onto the cyclic shifted ZC sequences, each available random access signature mapped onto a cyclic shifted ZC sequence using a restricted set of all possible sequences, the restricted set determined according to the indication.

In another aspect of the present invention, a network for establishing a communication link with a mobile terminal is provided. The network includes a transmitter transmitting messages to the mobile terminal, a receiver receiving messages from the mobile terminal and a controller generating sequences corresponding to signatures available for random access, controlling the transmitter to transmit an indication of whether high speed mobility is supported, processing a received access request from a mobile terminal that uses a selected one of the generated sequences, and correlating the received request to each of the generated sequences in order to determine which of the generated sequences was used by the mobile terminal, wherein the controller generates the sequences according to a process that either supports high mobility or does not support high speed mobility.

It is contemplated that the generated sequences are cyclic shifted Zadoff-Chu (ZC) sequences and the controller maps allowable signatures onto the cyclic shifted ZC sequences. It is further contemplated that the controller maps each available random access signature onto a cyclic shifted ZC sequence using all possible cyclic shifted ZC sequences if high-speed mobility is not supported. Preferably, the controller maps each available random access signature onto a cyclic shifted ZC sequence using a restricted set of all possible sequences, the restricted set determined according to a sequence index.

In another aspect of the present invention, a network for establishing a communication link with a mobile terminal is provided. The network includes a transmitter transmitting messages to the mobile terminal, a receiver receiving messages from the mobile terminal and a controller controlling the transmitter to transmit an indication of whether a cell supports high speed mobility and processing a received request to access the network from the mobile terminal, wherein the indication indicates information on restricted use of cyclic shifts and the access request is based on the indication.

It is contemplated that the indication comprises one bit. It is further contemplated that the controller further generates sequences corresponding to signatures available for random access, the sequences generated according to a process that either supports high mobility or does not support high speed mobility and correlates the received access request to each of the generated sequences in order to determine which of the generated sequences the mobile terminal used when sending the access request. Preferably, the generated sequences are cyclic shifted Zadoff-Chu (ZC) sequences and the controller maps allowable signatures onto the cyclic shifted ZC sequences, each available random access signature mapped onto a cyclic shifted ZC sequence using a restricted set of all possible sequences, the restricted set determined according to the indication.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention allows a UE 1 to correctly map the signature indexes onto the cyclic shifted ZC sequences when the deployed cells support a high-speed mobility UE 1. The present invention proposes to inform a UE 1 whether a cell supports high-speed mobility such that RACH signatures may be correctly mapped onto the cyclic shifted ZC sequences. This information may either be broadcast on the system information in a cell or fixed in the standard. Reference will now be made in detail to the preferred embodiments of the present invention, examples of which are illustrated in the accompanying drawings.

The ZC sequences of odd length N are defined by the following equation:

$$a_u(k) = \exp[-j2\pi M(k(k+1)/2N)], \text{ where:}$$

N is a sequence length,

M=1 ... N−1 is a root index of different sequences, and k=0 ... N−1 are indexes of the samples of a sequence.

ZC sequences have ideal correlation properties in the absence of frequency error, such that the periodic autocorrelation shows no side-peaks and the cross-correlation between two sequences with different a root index M has a constant value when the index of the samples of a sequence N is a prime number. Therefore, cyclic shifts of a sequence form an ideal set of signatures for RACH preambles because their cross-correlation is zero and they can all be detected simultaneously using frequency domain processing.

The number of cyclic shifts available for a single root index M depends on the length of the sequence and the propagation delay uncertainty: The shift must be larger than the maximum propagation delay for given cell sizes.

Figure 1:
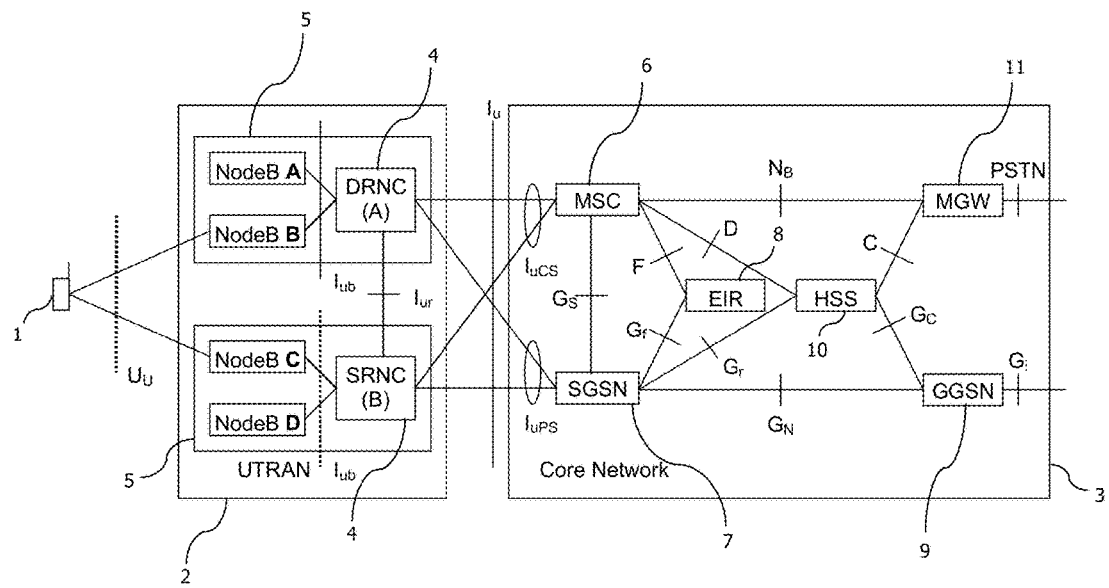
FIG. 1 illustrates an overview of a UMTS network.
Figure 2:
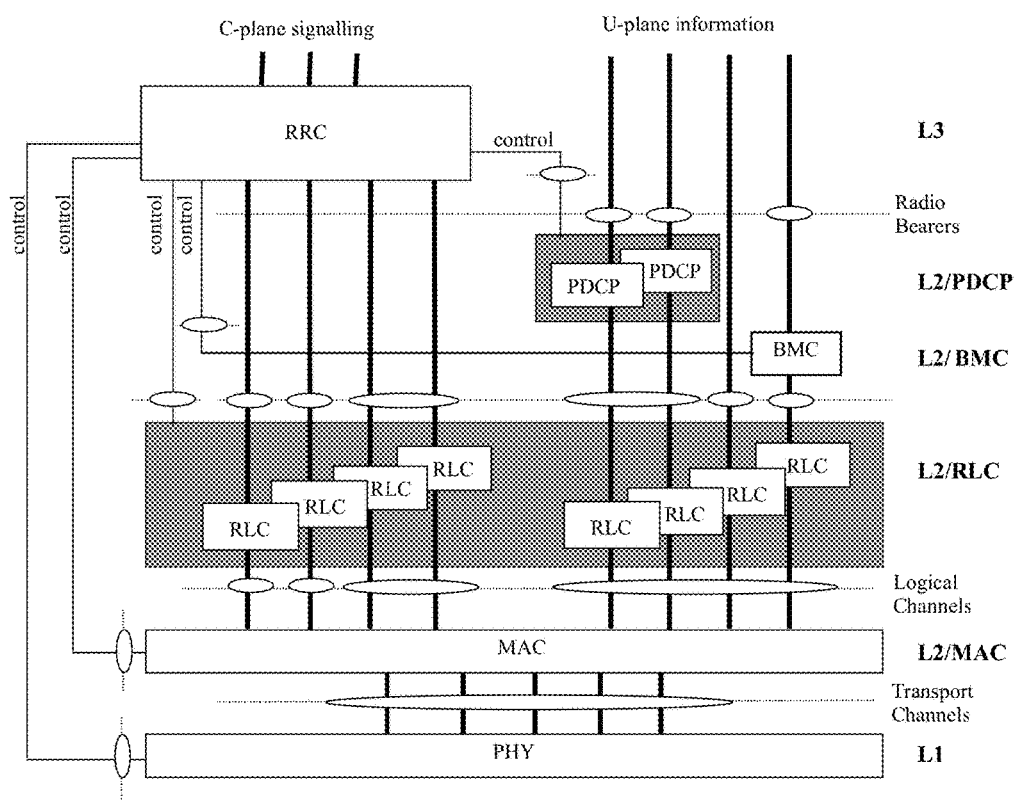
FIG. 2 illustrates a structure of a radio interface protocol between a UE and the UTRAN according to the 3GPP radio access network standards.
Figure 3:
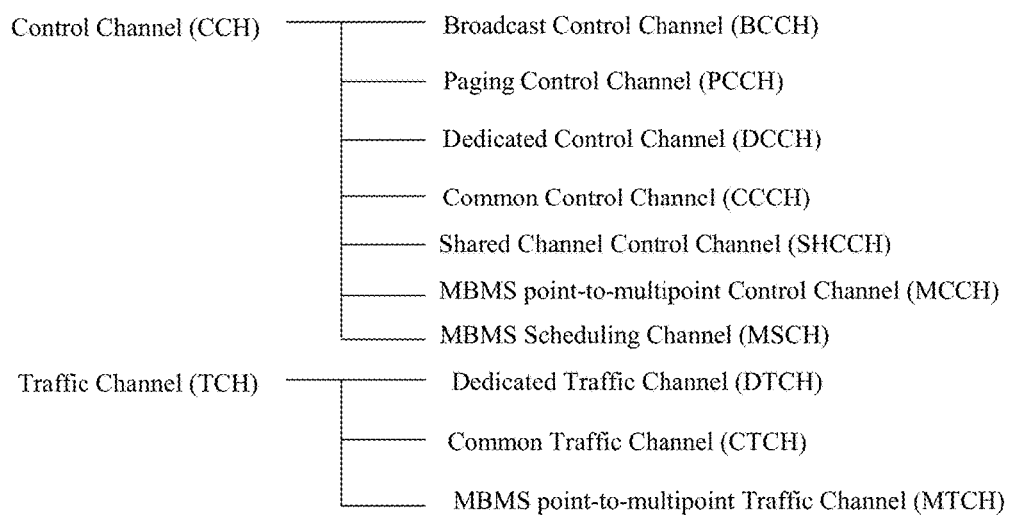
FIG. 3 illustrates the different logical channels.
Figure 4:
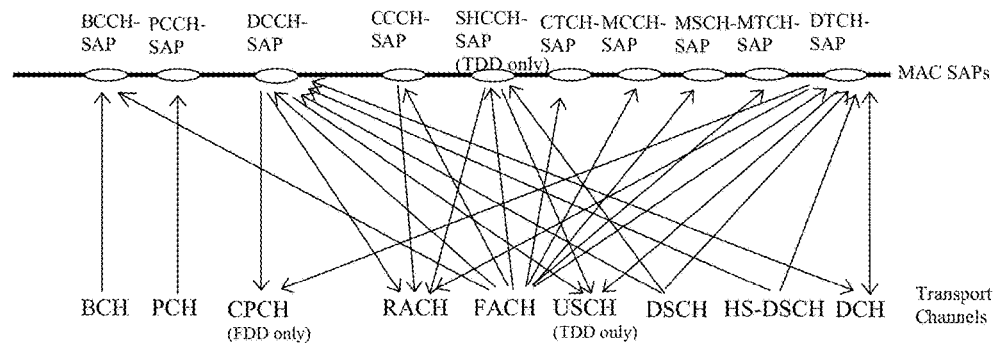
FIG. 4 illustrates logical channels mapped onto transport channels as seen from the UE side.
Figure 5:
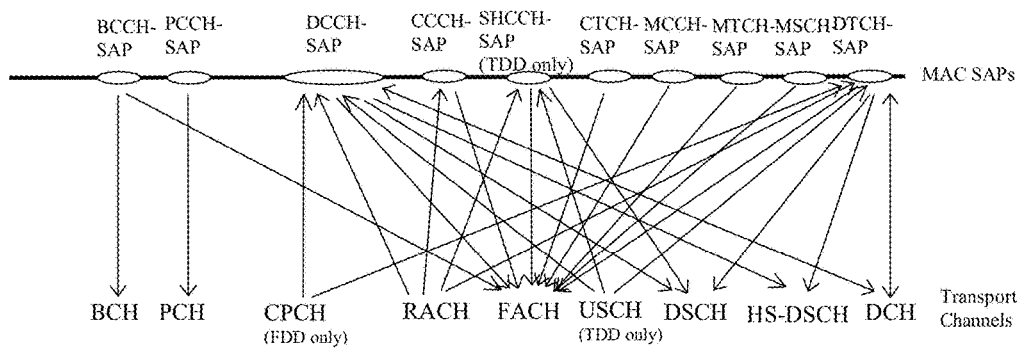
FIG. 5 illustrates logical channels mapped onto transport channels as seen from the UTRAN side.
Figure 6:
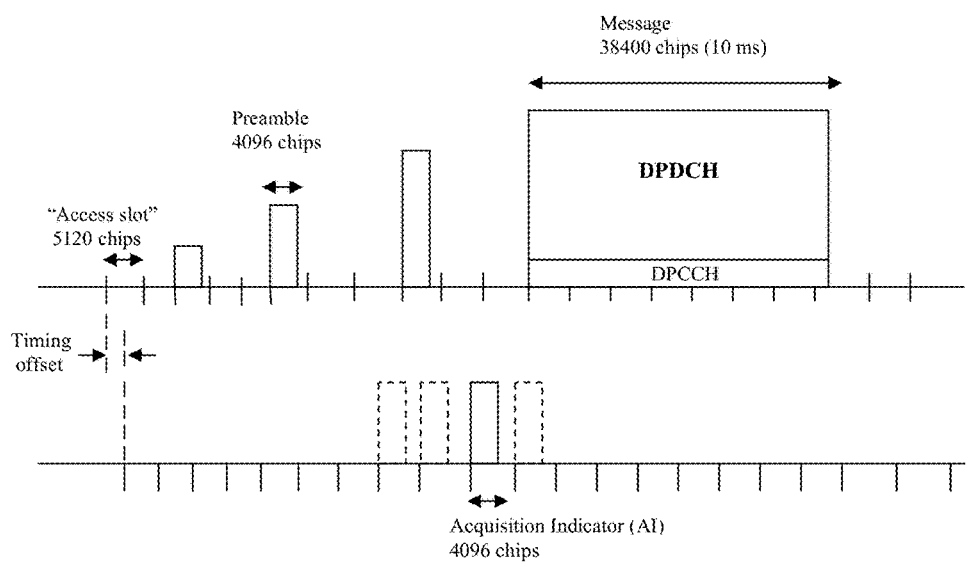
FIG. 6 illustrates a power ramping procedure.
Figure 7:
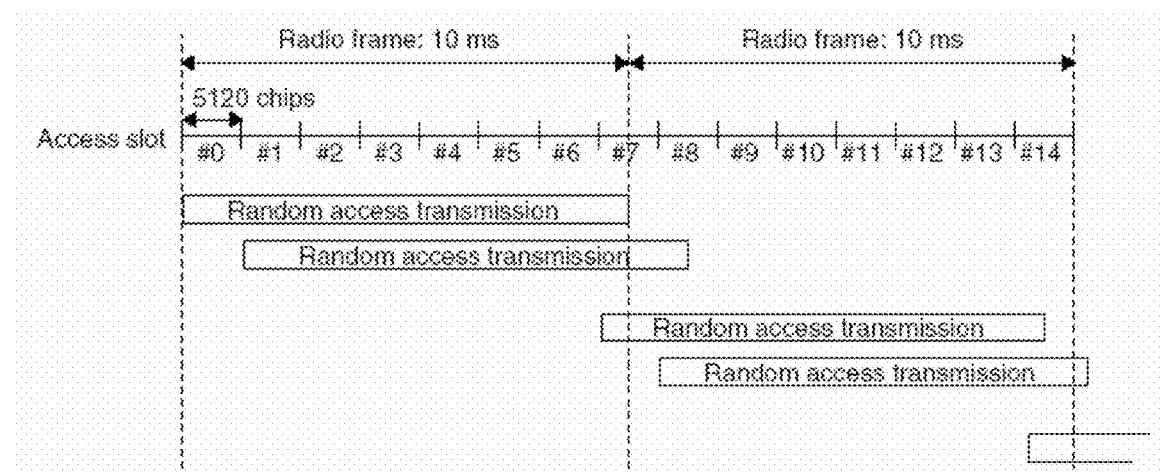
FIG. 7 illustrates the number and spacing of access slots.
Figure 8:
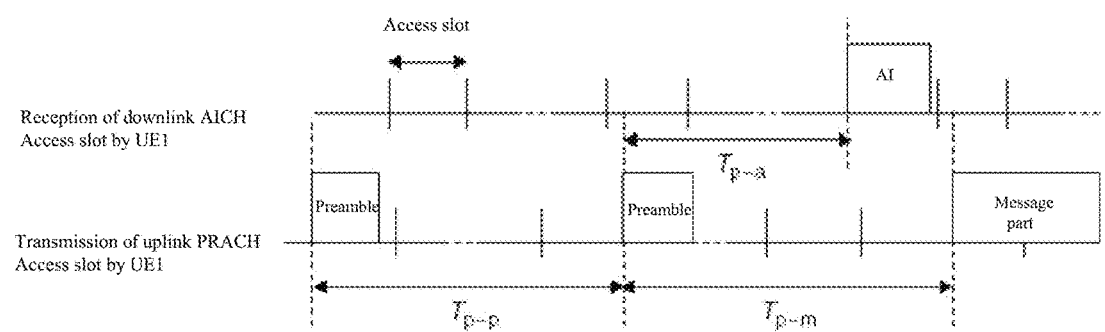
FIG. 8 illustrates the timing of the preamble, Access Indicator and message part.
Figure 9:
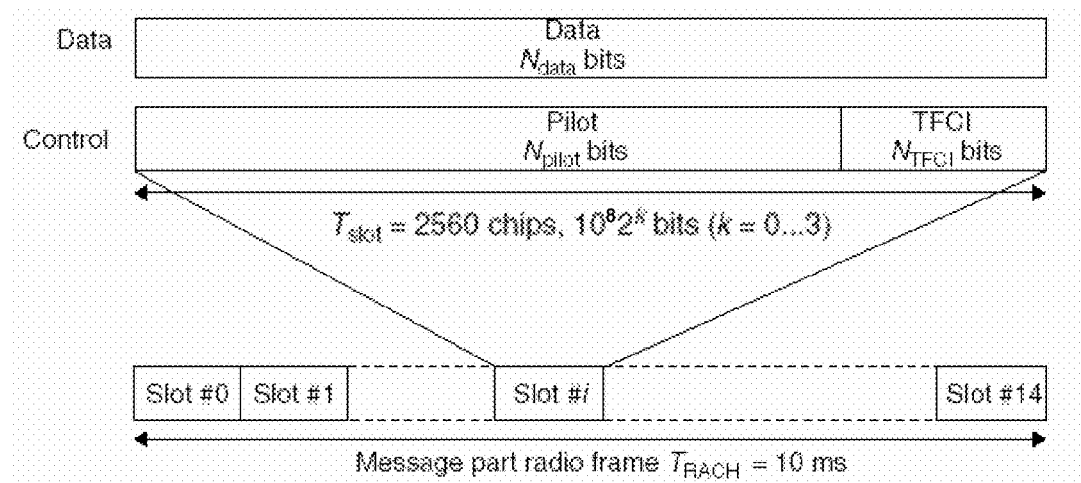
FIG. 9 illustrates the structure of the random access message part.
Figure 10:
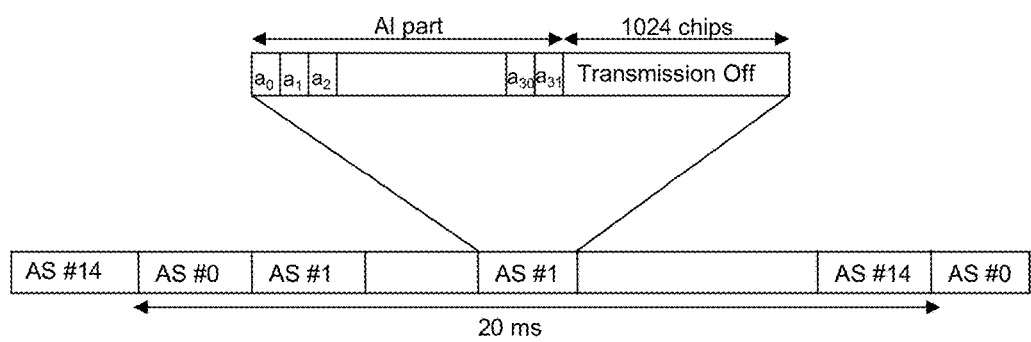
FIG. 10 illustrates the structure of the AICH.
Figure 11:
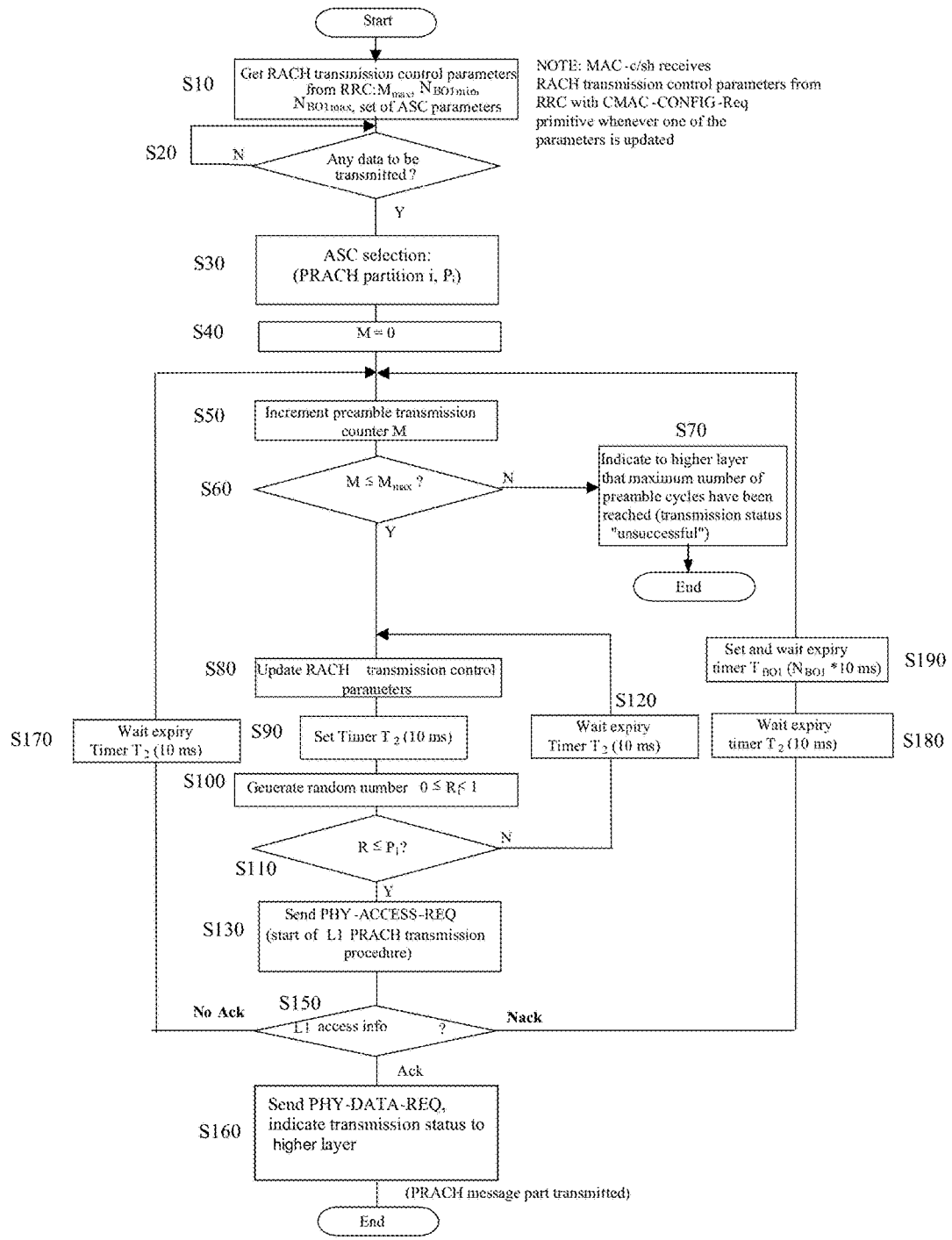
FIG. 11 illustrates a control access procedure.
Figure 12:
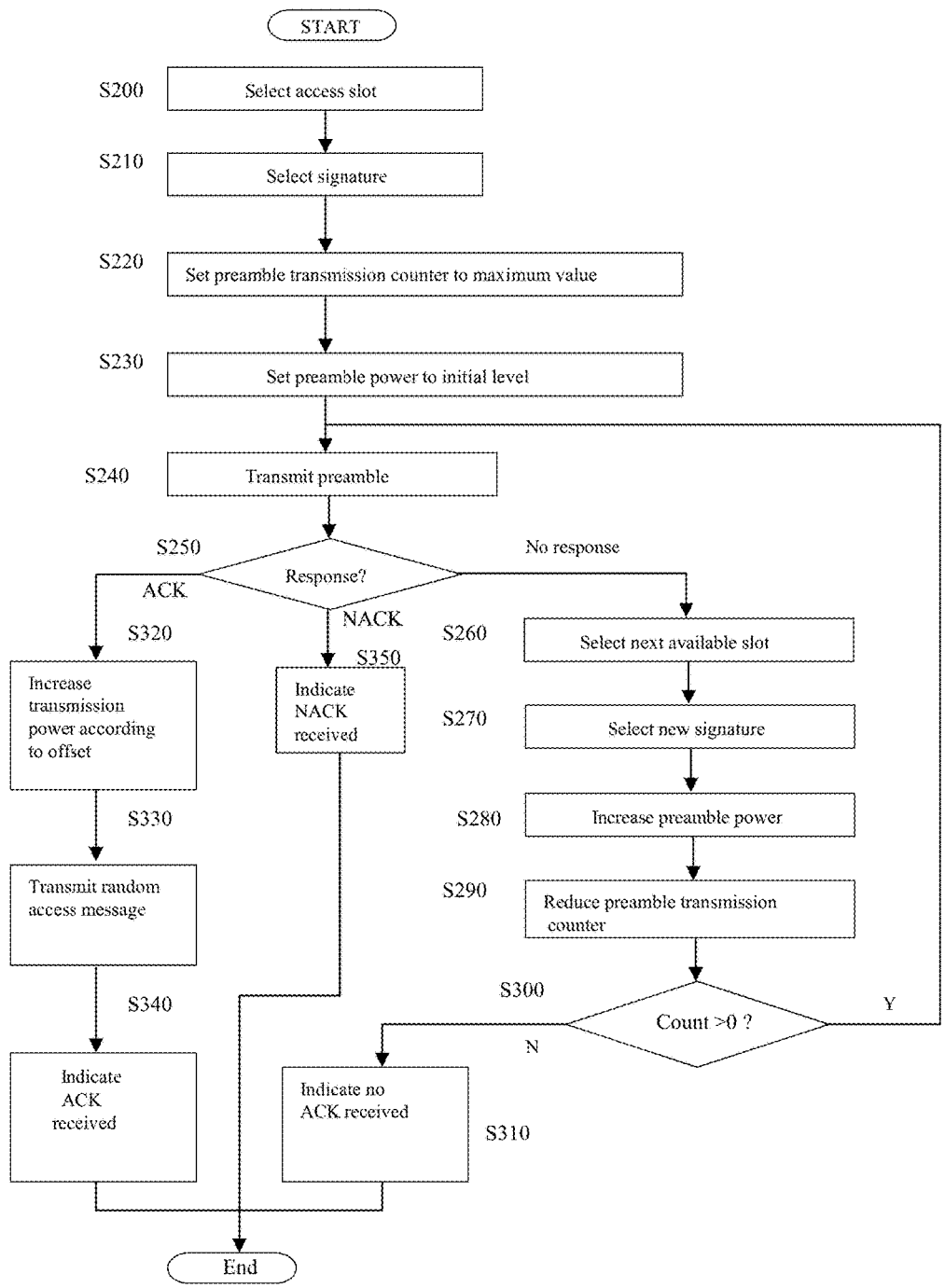
FIG. 12 illustrates a physical layer random-access procedure.
Figure 13:
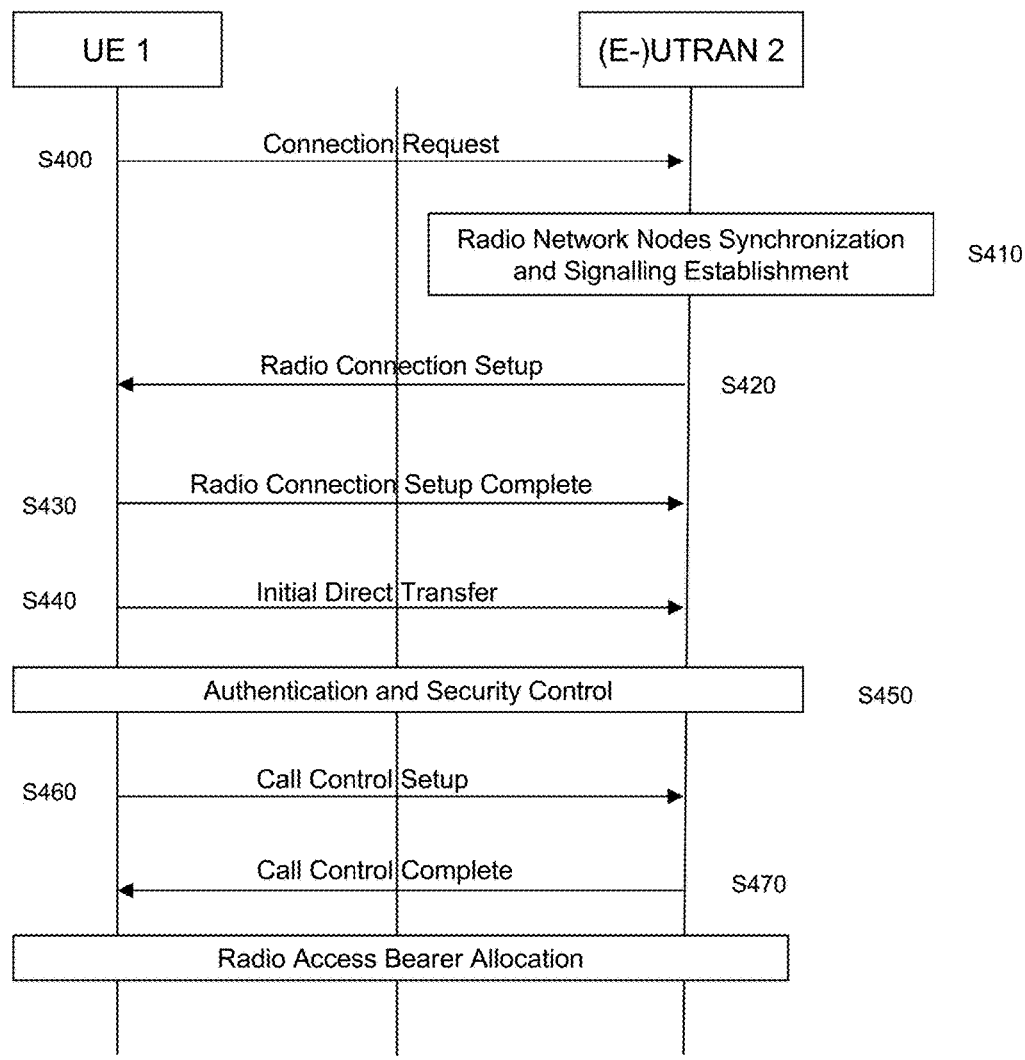
FIG. 13 illustrates a signaling establishment procedure between a UE and network.
Figure 14:
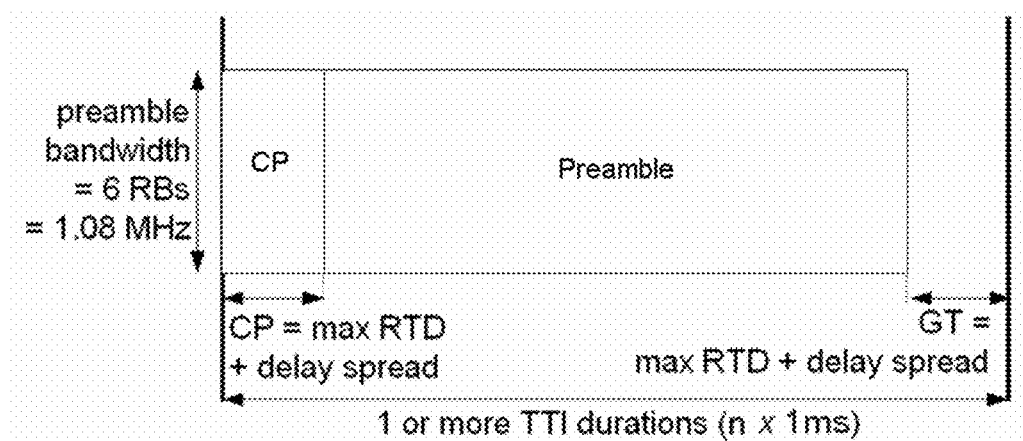
FIG. 14 illustrates a random access burst.
Figure 15:
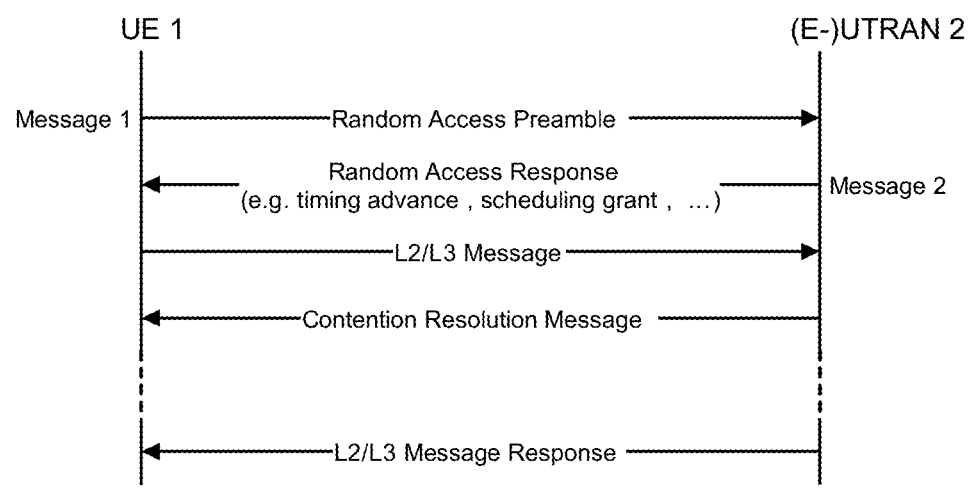
FIG. 15 illustrates a call flow diagram for a non-synchronized physical random access procedure.
Figure 16:
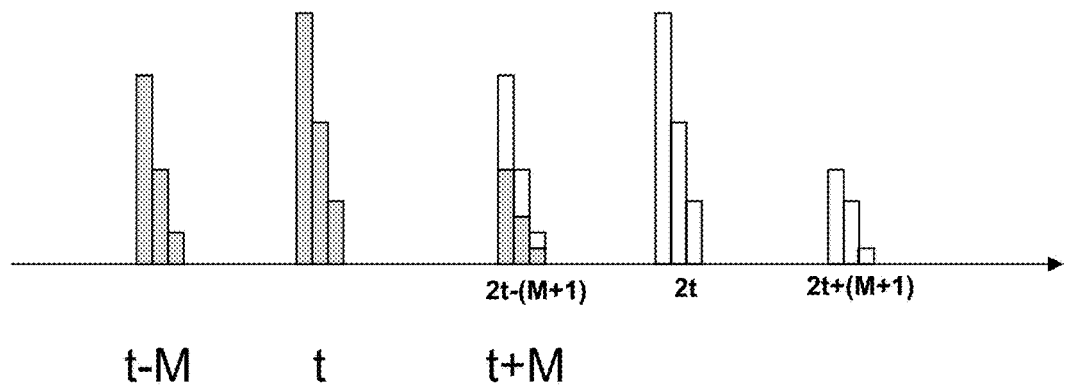
FIG. 16 illustrates an example of possible channel response of indexes M and (M+1) in a high Doppler environment.

However, this is true only if the frequency error is small, such as for low-speed mobility UEs 1. The ZC sequences are quite sensitive to the frequency error. The frequency error does not severely affect the cross-correlation between two ZC sequences but affects the detection of contiguous sequences due to overlapped channel response that cannot be discriminated from each other, an example of which is illustrated in FIG. 16. The duration between the correct timing of the delay profile in FIG. 16, such as t for M and 2t for M+1, and the alias of the delay profile, such as t−M and t+M, caused by large frequency offset in a high-speed mobility UE 1 is proportional to sequence index M.

Performance is improved if cyclic shifts in high Doppler environments are limited so that the cyclic shift pairs of each sequence period uncertainty are not in the sequence period uncertainty of any RACH preamble and the cyclic shift of t−1 of each sequence period uncertainty is different from the cyclic shifts of t+1 of all sequences period uncertainty. This results in using a restricted set of cyclic shifts for cells supporting high-speed mobility UEs 1.

The cyclic shift design may be done such that the alias channel response is not overlapped with the other circular shift positions since the frequency offset in a high-speed mobility UE 1 is proportional to sequence index M. Rules and methods of such design are known in the art.

The cyclic shift design is different depending upon whether a cell supports high-speed mobility UEs 1. The basic random access procedure is for a UE 1 to send a random access preamble (message 1), which carries the signature access to Node B 5. However, the access signature is only sent to meet coverage requirement for non-synchronized random access within the LTE framework.

The waveform of the LTE signature is based on Zadoff-Chu (ZC) with zero-correlation zones (ZCZ) and different mother sequence indexes when the required number of zones cannot be generated. This is because the number of ZCZ sequences is reduced inversely proportionally to cell radius. Therefore, additional ZCZ sequences from another index are added when the number of ZCZ sequences insufficient.

The zero-correlation zones allow for ideal detection in the presence of interfering preambles. The optimal auto-correlation property of the CAZAC sequence is destroyed when the Doppler spread of a high-speed mobility UE 1 induces the frequency offset, thereby resulting in degraded detection performance. Doppler shift and frequency error on the uplink have properties depending on the channel condition, for example, line-of-site (LOS) condition or Non-line-of-site (NLOS) condition.

Frequency offset due to UE 1 mobility is spread over a range from the carrier frequency In NLOS. Therefore, a UE 1 tracks around the $\Delta f_{BS} + \Delta f_{UE}$ frequency offset. The frequency offset of the received uplink signal is nearly zero and one way Doppler spread can be considered.

The maximum frequency offset of the receiver signal In LOS, such as when a high-speed mobility vehicle moves towards or away from the Evolved UMTS Terrestrial Radio Access Network (E-UTRAN) 2, is described as:

$$f_{offset,UL} = \Delta f_{UE} + 2f_{Doppler\_max}, \text{ where}$$

$f_{BS}$ denotes the base station frequency drift,
$\Delta f_{UE}$ denotes UE 1 frequency error and
$f_{Doppler\_max}$ denotes the maximum Doppler frequency.

The worst-case frequency offset is around 1400 Hz with mobility of 350 km/h at a 2 GHz carrier frequency. A UE 1 tracks around 650 Hz Doppler shift on the downlink in the LOS environment and then transmits uplink data compensated frequency offset in advance based on the estimated frequency offset on the downlink. Therefore, the frequency offset due to UE 1 mobility becomes twice of the Doppler shift of the channel at the NodeB 2, for example, 1300 Hz.

Figure 17:
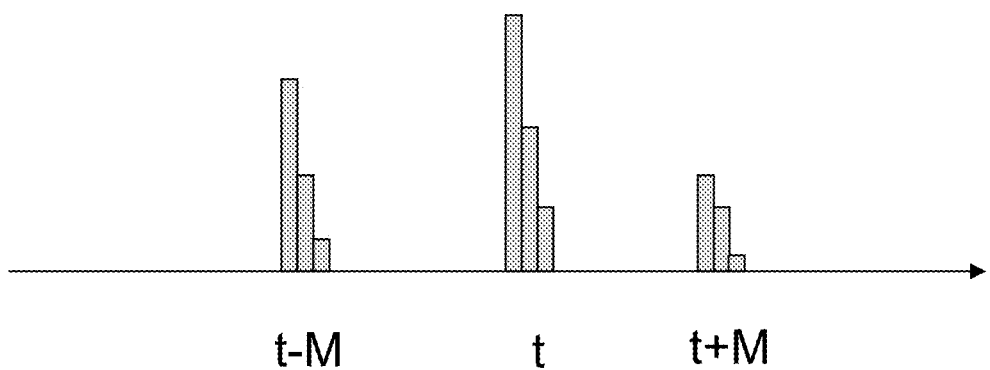
FIG. 17 illustrates the relationship between a sequence index M and various circular shift approaches when high-speed mobility is supported according to the present invention.

There may be two or three dominant components at the detection stage if there is frequency offset at the receiver due to Doppler spread or residual frequency offset, as illustrated in FIG. 17. Therefore, the frequency offset spreads the channel response over a wide range depending on the sequence index M that is used.

It is possible to predict where the channel response will occur if frequency offset exists when the ZC sequence index is known. The circular shift should be designed such that the alias channel response is not overlapped with the other circular shift positions. Therefore, the cyclic shift is depends not only on the cell size but also is proportional to the sequence index M, which results in the restricted set of cyclic shifts as compared to the low Doppler case and also in different RACH signature mapping.

The methods and approaches regarding how to design the cyclic shifts when a cell supports high-speed mobility are known in the art. For example, rules for three different approaches are proposed.

The first approach is an "additional margin method" where:

$$1 \leq M < 2T_0 \text{ and } N - 2T_0 < M < N - 1$$

The second approach is a "multiple circular shifts as one opportunity method" where:

$$2T_0 \leq M < \lfloor N/3 \rfloor \text{ and } N - \lfloor N/3 \rfloor < M \leq N - 2T_0$$

The third approach is an "index selection method" where:

$$\lfloor N/3 \rfloor \leq M \leq \lfloor 2N/3 \rfloor$$

In all three approaches, N is a sequence length or ZC sequence length, M is one sequence index or a ZC root index, and $T_0$ is the minimum cyclic shift for a given cell based on cell size. The necessary information, such as N, can be fixed in a standard while other information, such as $T_0$ and M, should be broadcast on the system information.

The present invention proposes that the network broadcast one information bit to inform a UE 1 if high-speed mobility UEs is supported. This information bit would enable correct mapping of RACH signatures onto the cyclic shifted ZC sequences. A UE 1 reads the information bit indicating support of high-speed mobility in a cell or indicating the use of a restricted set of cyclic shifts upon receiving a broadcast message relative to RACH information.

Information related to $T_0$ and M shall have already obtained by a UE 1 from information broadcast by the E-UTRAN 2 before processing the information bit. The UE 1 shall have also already obtained information related to N and the maximum number of RACH signatures from the broadcast information if those values are not fixed by a standard. The UE 1 then determines whether the information bit indicates that high-speed mobility is supported.

Mapping of RACH signatures onto the cyclic shifted ZC sequences can be easily performed for each cell when high-speed mobility is not supported, as indicated by the information bit having a value of "FALSE" or "0." A UE 1 and E-UTRAN 2 can map RACH signatures onto the ZC sequences of index M, with RACH signatures incrementally mapped onto subsequent cyclic-shifted versions by $T_0$ of the same ZC sequence until all possible cyclic shifts have been mapped for a given index M. New consecutive indexes M are added until the total number of signatures equals a value specified in the standard or system information.

The E-UTRAN 2 may broadcast only one index M, with the UE 1 using consecutive indexes to generate the number of required preambles. An alternative is for the E-UTRAN 2 to broadcast a set of several indexes M not necessarily consecutive to each other, with the UE 1 using the first index within the set and then using consecutive indexes within the set and mapping signatures in the same manner by starting from a higher or lower sequence index.

Specifically, the UE 1 starts mapping RACH signatures onto the cyclic shifted ZC sequences by mapping onto the first ZC sequence of the received index M or on the first index M in a received list. The UE 1 then incrementally maps the next subsequent signatures onto subsequent right-cyclic-shifted versions by the minimum cyclic shift length $T_0$ of the same ZC sequence index M until the maximum number of RACH signatures is reached or all possible cyclic shifts of index M have been obtained.

The UE 1 maps the next signature onto the next ZC sequence index M+1 or the next index in the list if the maximum number of RACH signatures is not reached before all possible cyclic shifts of index M are used. The UE 1 then maps the next subsequent signatures onto its subsequent right-cyclic-shifted versions by the minimum cyclic shift length $T_0$. This signature mapping is repeated over all ZC sequence indexes and stops when the maximum number of RACH signatures is reached.

The rules for using a restricted set of cyclic shifts for cells supporting high-speed mobility UEs 1 are applied when the information bit has a value of "TRUE" or "1." These rules can be either fixed in a standard or broadcast by the E-UTRAN 2.

Figure 18:
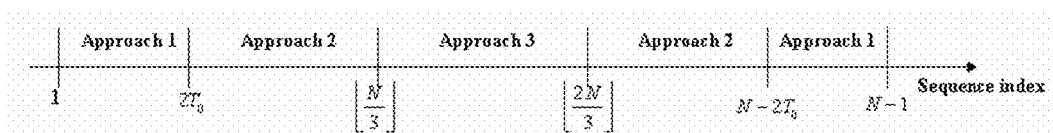
FIG. 18 illustrates channel response in high Doppler environments.

A UE 1 and the E-UTRAN 2 calculate the available cyclic shifts proportional to the index M and add new consecutive indexes M+1 by adjusting the cyclic shifts proportionally until the total number of signatures equals a value specified in the standard or system information. The relationship between the three cyclic shift approaches and the sequence index M is applied as illustrated In FIG. 18.

The E-UTRAN 2 may broadcast only one index M, with the UE 1 using consecutive indexes to generate the number of required preambles. An alternative is for the E-UTRAN 2 to broadcast a set of several indexes M not necessarily consecutive to each other, with the UE 1 using the first index within the set and then using consecutive indexes within the set and mapping signatures in the same manner by starting from a higher or lower sequence index and mapping signatures in the same manner by applying the relationships illustrated in FIG. 18, starting from a higher or lower sequence index.

Specifically, the UE1 starts mapping RACH signatures onto the cyclic shifted ZC sequences by determining, for received index M or for the first index M in a received list, the cyclic shift that can be applied according to the restricted set of cyclic shifts that can be used. The previously described rules are used as an example, but it should be noted that other possible rules for determining the restricted set of cyclic shifts could be applied.

The UE 1 determines the minimum cyclic shift $T_{min}$ according to the first approach if $1 \leq M < 2T_0$ or $N-2T_0 < M < N-1$. The UE 1 determines the minimum cyclic shift $T_{min}$ according to the second approach if $2T_0 \leq M < \lfloor N/3 \rfloor$ or $N-\lfloor N/3 \rfloor < M \leq N-2T_0$. The UE 1 determines the minimum cyclic shift $T_{min}$ according to the third approach if $\lfloor N/3 \rfloor \leq M \leq \lfloor 2N/3 \rfloor$. The determined $T_{min}$ value is then set with the minimum cyclic shift of index M.

The UE 1 maps the first signature onto the first ZC sequence of the received index M or on the first index M in a received list. The UE 1 then incrementally maps the next subsequent signatures onto subsequent right-cyclic-shifted versions by the minimum cyclic shift length $T_{min}$ of the same ZC sequence index M until the maximum number of RACH signatures is reached or all possible cyclic shifts of index M have been obtained.

The UE 1 selects the next ZC sequence index M+1 or the next index in the list and maps the next signature onto the ZC sequence of index M+1 or the next index in the list if the maximum number of RACH signatures is not reached before all possible cyclic shifts of index M are used. The UE 1 determines the minimum cyclic shift $T_{min}$ according to the first approach if $1 \leq (M+1) < 2T_0$ or $N-2T_0 < (M+1) < N-1$. The UE 1 determines the minimum cyclic shift $T_{min}$ according to the second approach if $2T_0 \leq (M+1) < \lfloor N/3 \rfloor$ or $N-\lfloor N/3 \rfloor < (M+1) \leq N-2T_0$. The UE 1 determines the minimum cyclic shift $T_{min}$ according to the third approach if $\lfloor N/3 \rfloor \leq (M+1) \leq \lfloor 2N/3 \rfloor$. The determined $T_{min}$ value is then set with the minimum cyclic shift of index M+1.

The determined $T_{min}$ value is then set with the minimum cyclic shift of index M+1. The UE 1 then incrementally maps the next subsequent signatures onto subsequent right-cyclic-shifted versions by the minimum cyclic shift length $T_{min}$ of the same ZC sequence index M+1 until the maximum number of RACH signatures is reached or all possible cyclic shifts of index M+1 have been obtained. This signature mapping is repeated over all ZC sequence indexes and stops when the maximum number of RACH signatures is reached.

Figure 19:
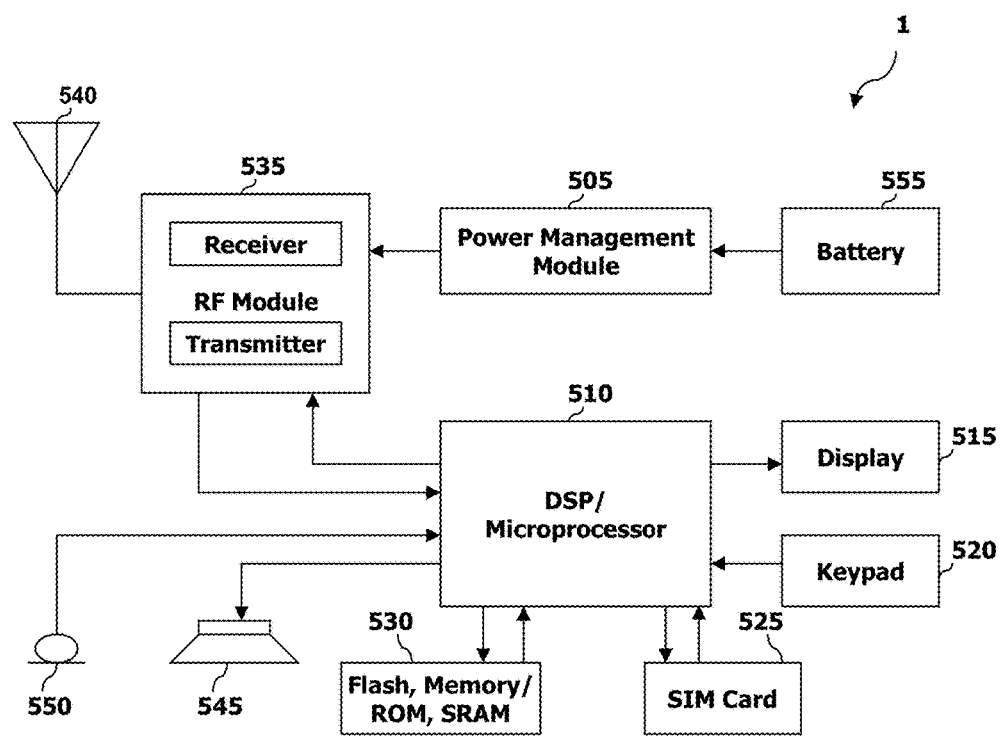
FIG. 19 illustrates a block diagram of a mobile station (MS) or access terminal (AT) according to the present invention.

FIG. 19 illustrates a block diagram of a mobile station (MS) or UE 1. The AT 2 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of performing a random access procedure by a user equipment (UE), the method comprising:
receiving, by the UE, system information comprising a high-speed related parameter, an index of a root sequence and information about a length of a cyclic shift from a network, the high-speed related parameter representing either TRUE or FALSE, wherein TRUE corresponds to a restricted set of cyclic shifts and FALSE corresponds to an unrestricted set of cyclic shifts, and
wherein the restricted set of cyclic shifts is determined based on the index of the root sequence and the length of the cyclic shift;
if the received high-speed related parameter represents TRUE,
generating, by the UE, a first random access preamble sequence using the restricted set of cyclic shifts and the received index of the root sequence; and
transmitting, by the UE, the generated first random access preamble sequence to the network, and
if the received high-speed related parameter represents FALSE,
generating, by the UE, a second random access preamble sequence using the unrestricted set of cyclic shifts and the received index of the root sequence; and
transmitting, by the UE, the generated second preamble sequence to the network.

2. The method of claim 1, wherein the high-speed related parameter comprises one bit.

3. The method of claim 1, wherein the generating the first random access preamble sequence comprises:
generating, by the UE, a subsequent version of the first random access preamble sequence cyclically shifted by a next cyclic shift included in the restricted set of cyclic shifts; and
generating, by the UE, another subsequent version of the first random access preamble sequence using consecutive sequence indexes from the received root sequence index if a required number of preambles are not generated using the received root sequence index.

4. The method of claim 1, wherein the generating the second random access preamble sequence comprises:
generating, by the UE, a subsequent version of the second random access preamble sequence cyclically shifted by the length of the cyclic shift; and
generating, by the UE, another subsequent version of the second random access preamble sequence using consecutive sequence indexes from the received root sequence index if a required number of preambles are not generated using the received root sequence index.

5. The method of claim 1, wherein the restricted set of cyclic shifts is determined by which range the index of the root sequence belongs to.

6. A method of performing a random access procedure by a network, the method comprising:
broadcasting, by the network, system information comprising a high-speed related parameter, an index of a root sequence and information about a length of a cyclic shift to a user equipment (UE), the high-speed related parameter representing either TRUE or FALSE, wherein TRUE corresponds to a restricted set of cyclic shifts and FALSE corresponds to an unrestricted set of cyclic shifts, and
wherein the restricted set of cyclic shifts is determined based on the index of the root sequence and the length of the cyclic shift; and
if the broadcast high-speed related parameter represents TRUE,
receiving, by the network, a first random access preamble sequence from the UE, the first random access preamble sequence generated using the restricted set of cyclic shifts and the received index of the root sequence, and
if the broadcast high-speed related parameter represents FALSE,
receiving, by the network, a second random access preamble sequence from the UE, the second random access preamble sequence generated using the unrestricted set of cyclic shifts and the received index of the root sequence.

7. The method of claim 6, wherein the high-speed related parameter comprises one bit.

8. The method of claim 6, further comprising:
receiving a subsequent version of the first random access preamble sequence cyclically shifted by a next cyclic shift included in the restricted set of cyclic shifts; and
receiving, by the network, another subsequent version of the first random access preamble sequence generated using consecutive sequence indexes from the received root sequence index if a required number of preambles are not generated using the received root sequence index.

9. The method of claim 6, further comprising:
receiving, by the network, a subsequent version of the second random access preamble sequence cyclically shifted by the length of the cyclic shift; and
receiving, by the network, another subsequent version of the second random access preamble sequence generated using consecutive sequence indexes from the received root sequence index if a required number of preambles are not generated using the received root sequence index.

10. The method of claim 6, wherein the restricted set of cyclic shifts is determined by which range the index of the root sequence belongs to.

11. A user equipment (UE) for performing a random access procedure, the UE comprising:
a radio frequency (RF) module; and
a processor configured to control the RF module and configured to:
receive system information comprising a high-speed related parameter, an index of a root sequence and information about a length of a cyclic shift from a network, the high-speed related parameter representing either TRUE or FALSE, wherein TRUE corresponds to a restricted set of cyclic shifts and FALSE corresponds to an unrestricted set of cyclic shifts, and
wherein the restricted set of cyclic shifts is determined based on the index of the root sequence and the length of the cyclic shift; and
if the received high-speed related parameter represents TRUE,
generate a first random access preamble sequence using the restricted set of cyclic shifts and the received index of the root sequence; and
transmit the generated first random access preamble sequence to the network, and if the received high-speed related parameter represents FALSE,
generate a second random access preamble sequence using the unrestricted set of cyclic shifts and the received index of the root sequence; and
transmit the generated second preamble sequence to the network.

12. The UE of claim 11, wherein the high-speed related parameter comprises one bit.

13. The UE of claim 11, wherein the processor is further configured to:
generate a subsequent version of the first random access preamble sequence cyclically shifted by a next cyclic shift included in the restricted set of cyclic shifts; and
generate another subsequent version of the first random access preamble sequence using consecutive sequence indexes from the received root sequence index if a required number of preambles are not generated using the received root sequence index.

14. The UE of claim 11, wherein the processor is further configured to:
generate a subsequent version of the second random access preamble sequence cyclically shifted by the length of the cyclic shift; and
generate another subsequent version of the second random access preamble sequence using consecutive sequence indexes from the received root sequence index if a required number of preambles are not generated using the received root sequence index.

15. The UE of claim 11, wherein the restricted set of cyclic shifts is determined by which range the index of the root sequence belongs to.

16. A network for performing a random access procedure, the network comprising:
a radio frequency (RF) module; and
a processor control the RF module and configured to:
broadcast system information comprising a high-speed related parameter, an index of a root sequence and information about a length of a cyclic shift to a user equipment (UE), the high-speed related parameter representing either TRUE or FALSE, wherein TRUE corresponds to a restricted set of cyclic shifts and FALSE corresponds to an unrestricted set of cyclic shifts, and
wherein the restricted set of cyclic shifts is determined based on the index of the root sequence and the length of the cyclic shift; and
if the broadcast high-speed related parameter represents TRUE,
receive a first random access preamble sequence from the UE, the first random access preamble sequence generated using the restricted set of cyclic shifts and the received index of the root sequence, and
if the broadcast high-speed related parameter represents FALSE,
receive, via the receiver, a second random access preamble sequence from the UE, the second random access preamble sequence generated using the unrestricted set of cyclic shifts and the received index of the root sequence.

17. The network of claim 16, wherein the high-speed related parameter comprises one bit.

18. The network of claim 16, wherein the processor is further configured to:
receive a subsequent version of the first random access preamble sequence cyclically shifted by a next cyclic shift included in the restricted set of cyclic shifts; and
receive another subsequent version of the first random access preamble sequence generated using consecutive sequence indexes from the received root sequence index if a required number of preambles are not generated using the received root sequence index.

19. The network of claim 16, wherein the processor is further configured to:
receive a subsequent version of the second random access preamble sequence cyclically shifted by the length of the cyclic shift; and
receive another subsequent version of the second random access preamble sequence generated using consecutive sequence indexes from the received root sequence index if a required number of preambles are not generated using the received root sequence index.

20. The network of claim 16, wherein the restricted set of cyclic shifts is determined by which range the index of the root sequence belongs to.

* * * * *